Patented July 16, 1929.

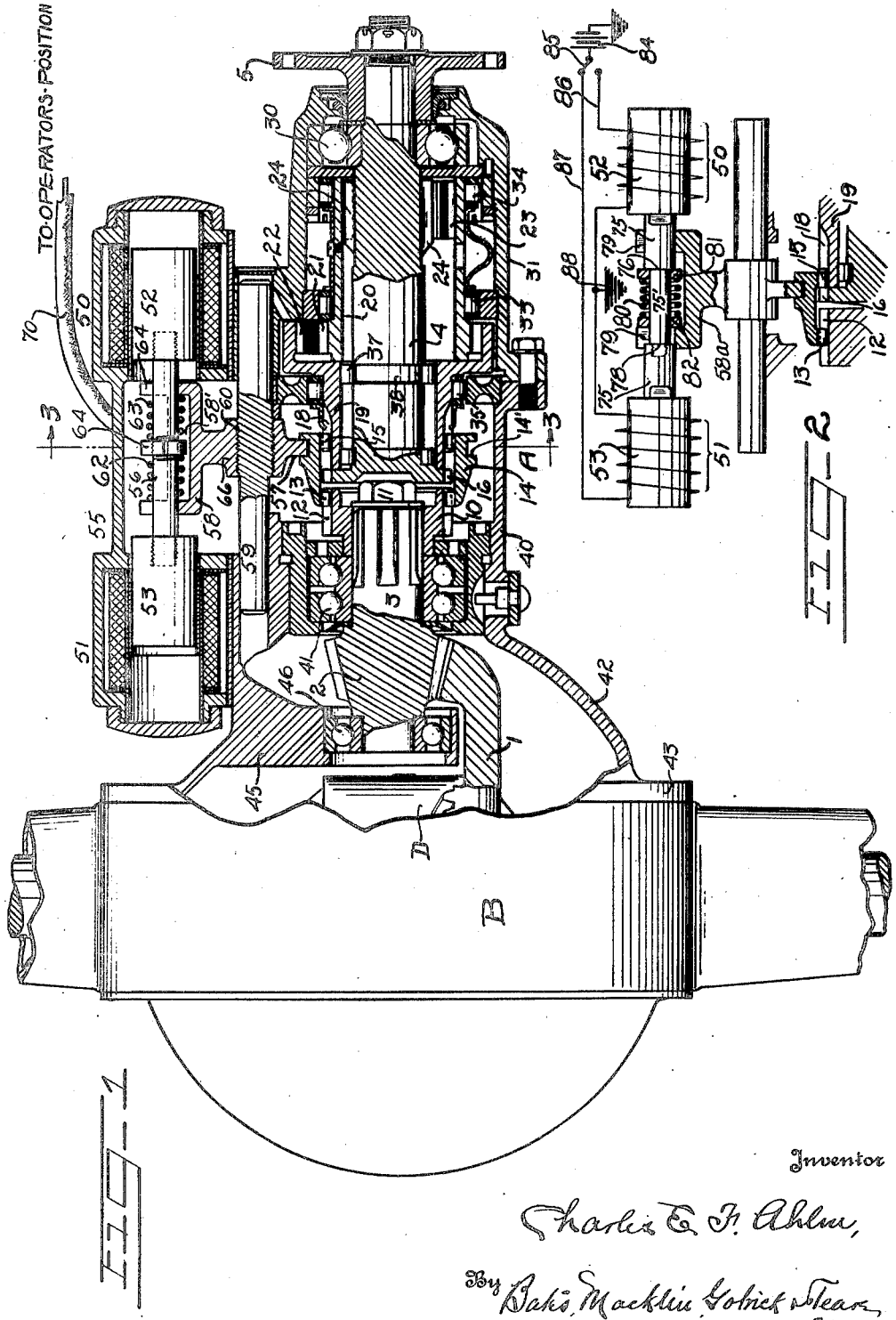

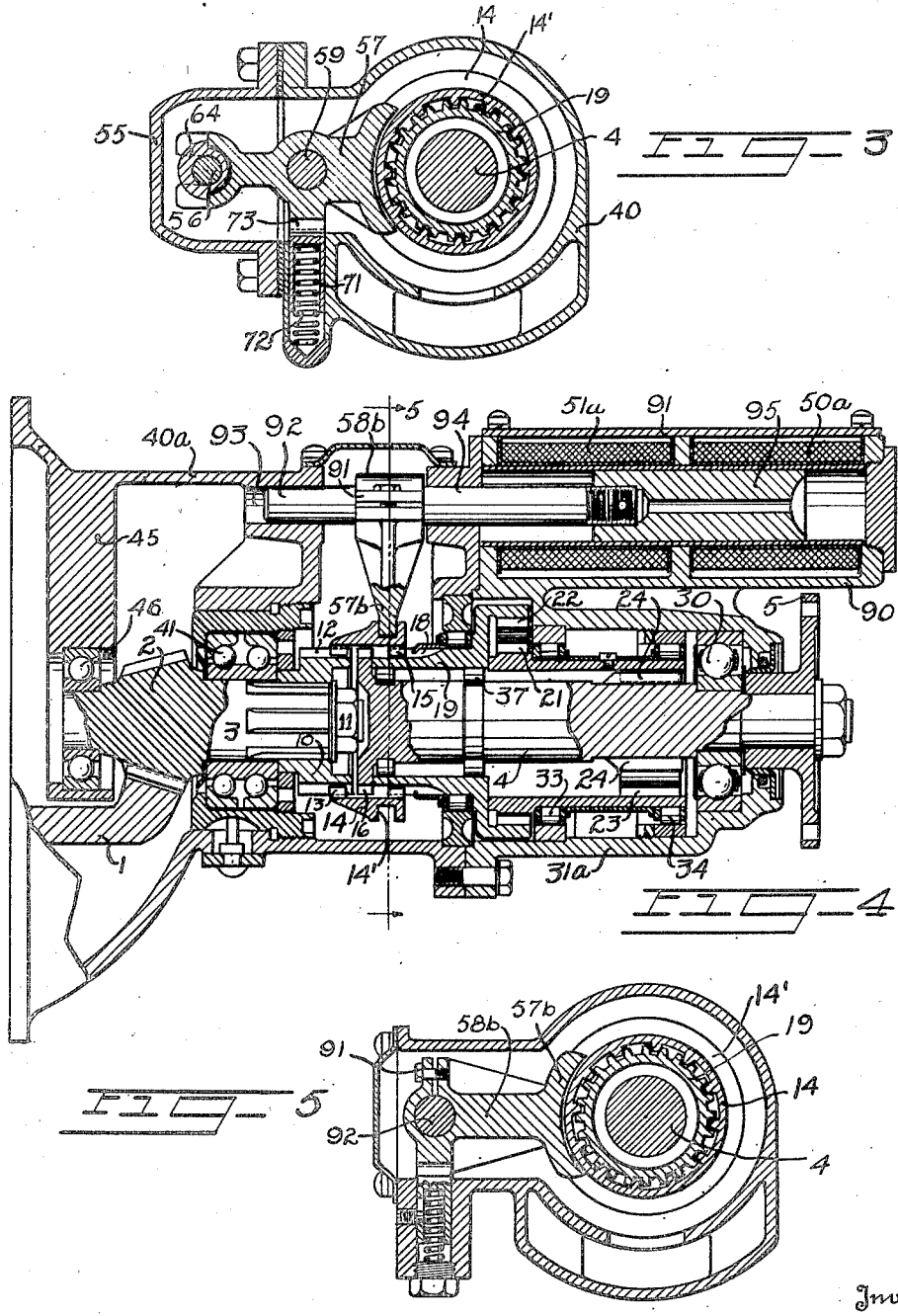

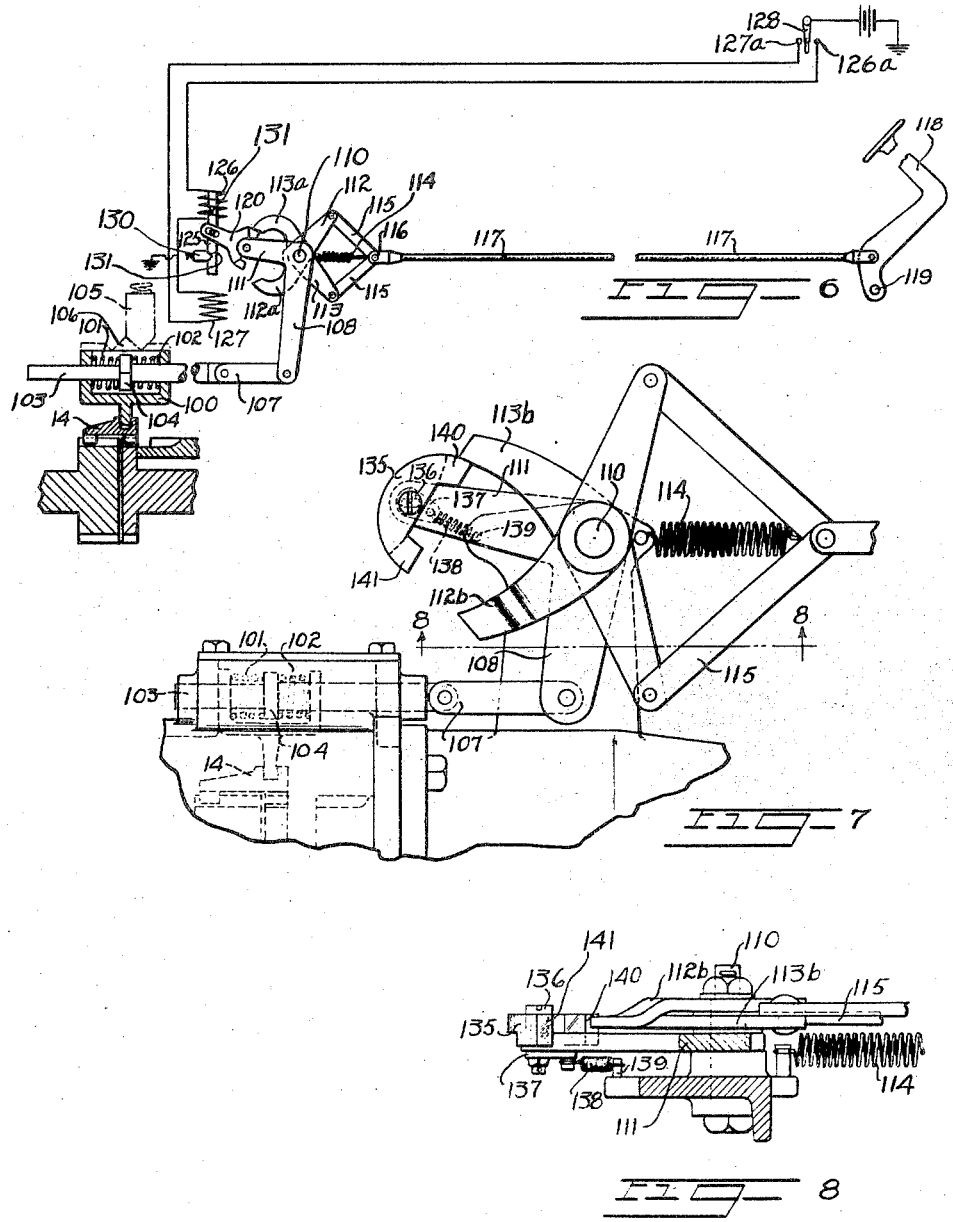

1,720,989

UNITED STATES PATENT OFFICE.

CHARLES E. F. AHLM, OF CLEVELAND, OHIO, ASSIGNOR TO AUTOMOTIVE PATENT HOLDING COMPANY, OF CLEVELAND, OHIO, A CORPORATION OF DELAWARE.

TRANSMISSION-GEAR MECHANISM.

Application filed August 12, 1926. Serial No. 128,745.

This invention relates to gear shifting mechanism and, as shown, is particularly adapted to be used with a gearing positioned on and carried by the rear axle housing of a motor vehicle.

The principal object is to provide a gear shifting mechanism for a gearing located on a floating portion of the vehicle, which shifting mechanism will not be affected by the floating movement in such a manner as to become accidentally shifted. More specifically it is an object to provide a gear shifting mechanism which may be controlled by a flexible connection from the gearing to the operator's position in the car.

Further objects of the present invention include the provision of a simple and easily manufactured and assembled mechanism of the type herein disclosed.

My mechanism in its preferred forms, will be more fully disclosed in the description to follow, which relates to the accompanying drawings. The essential characteristics will be summarized in the claims.

In the use of auxiliary transmissions, whereby additional speeds are obtained for each speed delivered by the main transmission mechanism, a great deal of trouble has been experienced when such auxiliary transmission is carried by a floating portion of the vehicle, as for instance the rear axle, by reason of the operating connection from the driver's position to the auxiliary transmission becoming accidentally actuated. The connection usually includes some system of links and levers leading from the operator's position in the car to a slidably mounted shifting fork connected to the gear or other dental element to be moved. It has been found impracticable to arrange the linkage in such a manner that the movement of the rear axle incident to driving over rough roads will not sometimes cause the fork to be shifted accidentally. One reason is that in standard automobile constructions the rear axle either pivots about the front universal joint (in case a torque tube is used) or about torque rod connections with the frame in other cases; and in either case it is inconvenient to pivot the gear shifting lever and rear axle housing about the same axis.

It follows that when the rear axle moves up and down under such conditions as just mentioned the linkage must either include some loose play, which is obviously undesirable, or objectionable special constructions must be used with respect to the mounting for such lever and linkage. Other causes which I believe contribute to effecting such an accidental shift include the inertia of such linkage which must of course have considerable weight in order to both push and pull. My invention overcomes these difficulties as will be presently shown.

My preferred gearing includes a casing which is shown as forming a part of the rear axle housing. The gearing employs internal-external gears and a clutch, shiftable in two directions, for connecting an extension of the propeller shaft directly to the differential gearing when in one position, and for effecting a reduction gearing connection between this shaft and mechanism when in another position.

It is to be understood that in carrying out my invention I may employ any means which is adapted to be operated by a flexible connection from the operator's position. I have shown in one form a solenoid operated clutch shift, in which case the flexible connection comprises conductor wires and a suitable conduit therefor. I also contemplate, and have shown, a selector mechanism which may be operated by a flexible connection (a cable for example) leading to such means as a clutch pedal, and this selecting mechanism may be operated automatically on each successive depression of the pedal, or may operate electrically as by a switch at the operator's position. Other applications of power which I contemplate using, include hydraulic means which would function similarly to brake mechanisms now in general use on four wheel brake equipped automobiles, or I may use the exhaust from the engine as is commonly done in connection with reciprocating windshield wipers.

In the drawings Fig. 1 is a substantially central horizontal sectional plan of one form of my mechanism shown in connection with a portion of the rear axle housing; Fig. 2 is a fragmentary view of a modified form of shifting means; Fig. 3 is a transverse section taken therethrough as indicated by the line 3—3 on Fig. 1; Fig. 4 is a sectional plan similar to Fig. 1 showing a modified form of solenoid arrangement; Fig. 5 is a transverse section taken along the lines 5—5 on Fig. 4; Fig. 6 is a diagram illustrating the selector feature of my invention, selection being accomplished by means of solenoids; Fig. 7 is a fragmentary view of an automatically operated selector mechanism; Fig. 8 is a side elevation of this latter mechanism.

Referring in detail to the drawings and indicating the various parts by suitable characters, A (Fig. 1) represents the housing for the gearing proper and B the rear axle housing. The housing B contains the usual differential gearing, a portion of which is shown at D and which may have the usual bevel "ring" gear 1, which meshes with a cooperating bevel pinion 2 on a stud shaft 3. The shaft 3 is suitably connected as will hereinafter be more fully described to an intermediate shaft 4, both directly and by suitable reduction gearing, and the shaft 4 may have a flange rigid therewith as at 5 for making connection with the rear end of the usual propeller shaft, not shown, extending from the main transmission of the car. The means for establishing the direct and reduction gear connections consists as shown of clutch mechanism which includes a dental member 10, shown as splined on the forward end of the stub shaft 3 and as held in place by a suitable nut 11. This member 10 has elongated teeth 12 which slidably engage internal teeth 13 of a double clutch member 14. On the forward end of the member 14 are internal teeth 15 arranged to engage selectively with teeth 16, rigid with the shaft 4, and teeth 18 rigid on a tubular gear member 19. It will be apparent that when the clutch member 14 is slid to the left (as shown in Figure 1) the shafts 3 and 4 are connected directly together by reason of this clutch member bridging the teeth 12 and 16. Also that when the clutch member 14 is shifted to the right, the gear member 19 is coupled directly to the shaft 3. In this position the shaft 3 is driven at a reduced speed by the shaft 4 through an eccentrically mounted internal-external gear member 20, having external teeth 21 meshing with internal teeth 22 on the gear member 19, and internal teeth 23 meshing with external teeth 24 shown as formed on the shaft 4.

Any suitable bearing arrangement may be employed to support these rotating parts. As shown, the shaft 4 is supported at one end by rolling bearings 30 carried by a forward section of the gearing housing indicated at 31. The internal-external gear 20 is similarly supported by rolling bearings 33 and 34 carried by the same section of the casing. The tubular gear 19 has a support by reason of rolling bearings 35, and this tubular gear in turn supports the rear end of the shaft 4 by reason of suitable rolling bearings 37 positioned between the cylindrical inner surfaces of the tubular gear member and peripheral grooves 38 in the shaft 4.

The rear end section of the transmission housing A also forms a part of the differential housing and comprises a casing portion 40 arranged to support rolling bearings 41 for the stub shaft 3. This casing flares out as shown at 42 and is provided with a flange 43 adapted to be bolted to the main section of the differential housing. In order to support the rear end of the stub shaft 3, I provide a bearing bracket 45 preferably cast integrally with the flared out portion 42 and which as shown carries a rolling bearing 46 embracing the reduced rear end of the stub shaft.

One of the primary advantages of my construction is that I am enabled to control the shifting means by a flexible connection leading from the driver's position to such means. I accomplish this in the embodiment shown in Fig. 1, by reason of providing solenoids for operating the clutch member 14. The solenoids are indicated at 50 and 51, one being arranged to act on a solenoid bar 52 to cause the forward shifting of the clutch member for reduced speed and the other acting on a bar 53 to move the clutch member rearwardly to couple the shafts 3 and 4 directly together. These solenoids are shown as contained in a suitable casing 55 which may be bolted or otherwise rigidly secured to the casing A. The solenoid bars, are shown as provided with a suitable connecting rod 56 which extends through a shifting member 58 recessed as at 58' and shown as provided at its lower end with a fork or like member engaging the usual peripheral channel 14' on the clutch member 14. To slidably support the member 58 I show in this embodiment a sliding bar 59 substantially rigid therewith and having its ends supported in recesses formed in the casing structure. As shown the bar 59 is reduced in diameter at its rearward end and threaded at 60 into a boss 66 of the member 58 for convenience of assembly.

When the bar 57 is caused to move by energization of either of the solenoids, such movement is transmitted indirectly to the member 58 by reason of suitable resilient means such as springs 62 and 63. These springs bear against an adjustable nut 64 carried by the bar 57 within the recess, and when the bar moves to the left, as when moved by the solenoid 51, the nut 64 tends to compress the spring 62, which in turn reacts against the rear end wall of the recess tending to move the member 58 rearwardly. Thus in shifting the teeth 15 out of engagement with the teeth 18 and into engagement with the teeth 16, if the teeth 15 and 16 are not properly positioned for engagement, as by reason of abutting each other, the action of the energized solenoid will be simply to compress the spring 62 while the solenoid bar moves to its final rearward position. Then, when the teeth 16 and 17 finally assume proper meshing position, the spring 62 will exert its force to move the member 58 rearwardly to complete the engagement.

By reason of the employment of such springs, I have also provided a cushion for the solenoid bars, thereby eliminating separate buffers. To illustrate, when the solenoid 51 is energized to move the carrier 58 out of the position shown in Fig. 1 and assuming the teeth 16 are in engageable position relative to the teeth 15 as is more often the case, the carriage 58 will move until the boss portion 66 thereof engages the adjacent portion of the casing as an abutment. Thereupon the shock due to the inertia of the moving bar will be counteracted by the spring 62 and any subsequent rebound movement will be absorbed by the spring 63.

To maintain the shifting member 58 in its two positions, I preferably provide a spring plunger such as shown in Fig. 3 at 71 carried in a suitably recessed portion of the casing section 40 and normally urged toward the member 58 by a spring 72. This plunger has a wedged point 73 cooperating with similarly shaped recesses in the side of the head.

By such an arrangement I am enabled to control a transmission such as shown to shift from one speed to another from a remote portion of the car, as for instance by a switch which may be located on the steering post, and arranged to selectively couple the power with the solenoids through a suitable flexible connection such as the flexible conduit 70.

In Fig. 2 which shows a modified form of a resilient connection, I have also shown more clearly the condition which obtains when one of the solenoid bars has completed its movement, but when the teeth to be engaged are in abutting relation thus preventing such engagement.

In this modification the solenoid bars 52 and 53 are shown as connected by a two part connecting bar 75. The right hand end of this two part bar is shouldered as at 76 and the left hand end as at 78, the portions immediately adjacent the shoulder being slidable in slots 79 in the shifting member 58ª. Surrounding the reduced central portion 75' of the connecting bar is a single spring 80 bearing at its respective ends against annular plates 81 and 82 slidably surrounding the reduced portion.

The operation of this modified form is substantially the same as of that shown in Fig. 1. The single spring 80 takes the place of the two springs 62 and 63 by reason of providing the double abutments 81 and 82. The bar 53 in this figure is shown as having been drawn by solenoid to compress the spring 80 which of course tends to move the member 58ª to the left in readiness to complete the shift when the teeth 15 and 16 are in proper relation.

Figure 2 also illustrates a convenient electrical hook up for the solenoids and comprises lead wires 86 and 87 for the solenoids 50 and 51 respectively and a return wire or ground 88. A source of electric supply, also grounded, is shown at 84 and a switch 85 is shown as positioned to supply current to the solenoid 51. The switch may be located at any convenient point near the driver's position as above explained.

In Fig. 4, I have shown a modified form of solenoid connection wherein the housing is made a part of the gearing casing. In this modification, a portion of a section of the transmission casing indicated at 31ª has an upwardly extending portion, 90 shown as substantially open at the top to admit the insertion of the solenoid coils. A suitable cover plate such as shown at 91 protects the coils from injury. The shifting head indicated at 58ᵇ is shown as clamped as at 91 to a bar 92 which is slidably mounted in recesses 93 and 94 in the casing sections 40ª and 31ª. The front end of the bar 92 is shown as threaded into a single solenoid bar 95 which is acted on by both solenoids 50ª and 51ª. By this arrangement, I eliminate one solenoid bar and also obviate the necessity for a separate slide or guide bar, such as the bar 59 in Fig. 1. The resilient connection between the piston head and the solenoid bar is not shown in Fig. 4, but it is understood it may be applied in the same manner to the bar 92, as shown in either Figures 1 or 2.

Referring to Fig. 6, I have shown the clutch member 14 connected with a clutch shifting head 100 which is equipped with springs 101 and 102 and which may be carried on an operating bar 103 provided with an abutment 104 arranged to be held in central position by the springs 101 and 102. Cooperating with the shifter head is a plunger 105 similar to that shown in Fig. 3 and engaging a wedge shaped projection 106 rigid on the shifter head 100. The operating member 103 may be slidable in suitable bearings in the casing (not shown) and is connected by a link 107 to an arm of a bell crank 108. The bell crank as shown is rigid on a shaft 110 which may be mounted in a suitable bracket (not shown) rigid on the gearing casing. Loosely mounted on shaft 110 is a pair of crossed levers indicated at 112 and 113, the former projecting forwardly of the shaft 110 at 112ª, the latter at 113ª. These levers are pivotally connected to links 115 shown as pivotally secured together at 116, at which point is attached a cable 117 leading to any suitable operating device such as the lever 118 supported on a suitable shaft 119. The cable may be held taut by a tension spring 114 secured at one end at the junction of the links 115 and at the other to any suitable stationary member. This spring also serves to spread the crossed arms to inactive position after each pull on the cable. Such a lever 118 may be rocked in the manner of the usual clutch pedal causing the arms 112ª and 113ª to be brought together toward one arm of the belt crank 108.

For the purpose of selectively controlling the action of these levers on the bell crank I have shown a dog 120 pivoted on the outer end of the arm 111, which when swung toward the arm 113ª, as shown, will be in path of movement of this arm and will therefore be engaged by that arm, which will thus turn the bell crank in a counter-clockwise direction withdrawing the rod 103 and shifting the clutch member 14 into engagement with a different set of teeth. The clutch teeth are illustrated diagramatically as representing such a clutch arrangement as shown in Fig. 1, the teeth being correspondingly designated. When the dog is turned in the opposite direction or toward the arm 112ª, a subsequent pull on the cable causes a reverse movement of the rod 103 and clutch member 14 because the arm 112ª now engages the dog, while the arm 113ª misses it and is idle. Means for setting the dog as shown in this figure comprises a solenoid operated bar 125 connected to the free end of the dog 120 and arranged to be moved by solenoids 126 and 127 having a connection with a switch 128 located at the operator's position. The switch is arranged to control which solenoid shall be energized by contact points 126ª and 127ª. The wiring for such pair of solenoids and power supply therefor may be, and is shown, the same as the wiring arrangement illustrated in Fig. 2 and will not therefore be described in detail.

To illustrate the operation of the above described mechanism it will be seen that when the operator wishes to shift from direct drive to the reduced drive, he will first move the switch 128 into contact with the point 127ª energizing the solenoid 127 and shoving the dog into position to be engaged by the arm 112ª. Any suitable means may be employed to hold the dog 120 in either of its thus selected positions, such for instance, as a spring plunger 130 engaging suitable notches 131 in the bar 125, wherefore the switch need only make contact and be returned immediately to inactive position. Then whenever the operator so desires, he effects the shift by depressing the lever 118.

I also contemplate effecting such selection automatically whereby the clutch is shifted in a new direction at each pull on the cable. Such means is illustrated in Figs. 7 and 8, and consists of a bell crank 108 with a similar arm 111 having at its outer end a pivoted dog 135. The dog, as shown, is rigid on a pin 136 freely mounted in the arm 111, the pin having rigidly mounted on its other end an arm 137. To this arm is attached a tension spring 138, the other end of which is anchored at 139 to a relatively stationary member such as a portion of the casing the location of the anchor being substantially in a radial plane, with reference to the shaft 110, lying substantially half way between the two positions of the arm 111. The dog 135 has abutments 140 and 141 positioned to engage respective sides of the lever 111 and also engageable by the arms 112ᵇ and 113ᵇ.

As shown in Fig. 7 the parts are in position to effect a counter-clockwise movement of the bell crank. It will be seen that further pull on the cable will cause the arms 112ᵇ and 113ᵇ to approach each other, the latter arm only engaging the abutment 140 until the complete shift is made. The cable will then be released, the arms spread by the spring 114, and the dog swung into its other position by the spring 138 ready to be engaged, on the next pull of the cable, by the arm 112ᵇ. Should the operator depress the lever 118 less than half of its intended throw and then release it, the parts will all be returned to initial position by the plunger 106 acting against one side of the wedge point 104 on the shifter head and by the spring 114 returning the crossed levers to inactive position; but once the arm 111 is thrown past a plane passing through the anchor post 139 and the axis of the shaft 110, the plunger 105 will have been withdrawn into active contact with the previously disengaged side of the wedge point and will therefore complete the shift.

From the foregoing description of my invention it will be seen that I have provided a gear shifting mechanism which will be operated by a flexible connection from the operator's position and which will therefore not be subject to the usual conditions which affect gear shift control arrangements, previously used, to sometimes cause the gears or other dental members to become accidentally shifted. It will be further seen that I have provided a comparatively simple means for shifting a dental element from one position to another electromagnetically which will not be likely to damage the teeth of such dental element. Furthermore, I have provided a novel means for selectively controlling the shifting mechanism whereby I am able to shift a gear or clutch element in alternate directions by applying force in one direction only.

I am aware that the invention is capable of other modifications and, as above mentioned, I contemplate using other sources of power than those illustrated in the drawings.

I claim:

1. In combination with a gearing having an element movable to two active positions, a manually operated member adapted to operate when moved in one direction only, settable means for connecting such member with the element comprising conjointly operated levers having a connection with said manually operated member, a movably mounted member connected with said element and a pivoted dog carried by said movable member and arranged to be interposed between it and the levers selectively and means whereby said dog is engaged by a different lever consequent upon each operating movement of the manually operated member.

2. In combination with a gearing having an element movable to two active positions, a manually operated member arranged to be active when moved in one direction only, means for connecting such member with the element comprising levers having a common connection with said manually operated member, a movable member having a connection with said element, and a single interponent arranged to be selectively interposed between the levers and movable member, one at a time, for determining the position of the element.

3. In combination with a gearing having an element movable to two active positions, a manually operated member arranged to be active when moved in one direction only, means for connecting such member with the element, comprising levers having a common pivot and connected with said manually operated member, a bell crank operably connected with the element and an interponent carried on the bell crank and movable into two positions, each position being such that one only of the levers moves the bell crank while the other lever moves idly.

4. In combination with a gearing having an element movable to two active positions, a reciprocable operating member, settable means for connecting such member with the element, comprising levers mutually connected with the reciprocable member, a bell crank operably connected with the element and an interponent carried on the bell crank and movable into two positions, each position being such that one only of the levers moves the bell crank while the other lever moves idly.

5. In combination with a motor vehicle having a frame, an axle having a floating movement relative to the frame, transmission gearing drivingly connected with the axle and mounted to move therewith, said transmission having a dental element movable in two directions to change from one speed to another, an operating member having a support rigid with the frame at the operator's position, a connection between said element and the operating member including a flexible member and means whereby a given pull on the flexible member operates to move the dental element in one direction and a succeeding pull operates to move it in the opposite direction.

6. In combination with a gearing having an element to be shifted to change from one speed to another, a manual control arranged to effect such shift, said control including a member arranged to be pulled, a pair of conjointly movable members acted on by such pull, and a member arranged to be positioned in the path of either of the conjointly movable members, said positionable member being connected with said element to be shifted to cause the element to be moved whenever the positionable member is moved by one of the conjointly movable members, whereby a given pull on the first named member may effect a shift of the element in one direction and a succeeding pull in a different direction.

In testimony whereof, I hereunto affix my signature.

CHARLES E. F. AHLM.